(12) United States Patent
Narayanan et al.

(10) Patent No.: US 8,768,865 B2
(45) Date of Patent: Jul. 1, 2014

(54) LEARNING SITUATIONS VIA PATTERN MATCHING

(75) Inventors: Vidya Narayanan, San Diego, CA (US); Sanjiv Nanda, Ramona, CA (US); Fuming Shih, Cambridge, MA (US)

(73) Assignee: Qualcomm Incorporated, San Diego, CA (US)

( * ) Notice: Subject to any disclaimer, the term of this patent is extended or adjusted under 35 U.S.C. 154(b) by 250 days.

(21) Appl. No.: 13/269,516

(22) Filed: Oct. 7, 2011

(65) Prior Publication Data

US 2012/0265717 A1 Oct. 18, 2012

Related U.S. Application Data

(60) Provisional application No. 61/434,400, filed on Jan. 19, 2011.

(51) Int. Cl.
*G06F 17/20* (2006.01)
*G01D 15/00* (2006.01)
*G06N 99/00* (2010.01)

(52) U.S. Cl.
CPC .................................. *G06N 99/005* (2013.01)
USPC ........................................... 706/12; 702/127

(58) Field of Classification Search
None
See application file for complete search history.

(56) References Cited

U.S. PATENT DOCUMENTS

| 7,570,943 | B2 | 8/2009 | Sorvari et al. |
| 2007/0036347 | A1 | 2/2007 | Teicher |
| 2009/0303204 | A1 | 12/2009 | Nasiri et al. |
| 2009/0305661 | A1 | 12/2009 | Ito |
| 2010/0001949 | A1 | 1/2010 | Shkolnikov et al. |
| 2010/0075639 | A1 | 3/2010 | Horvitz et al. |
| 2010/0217533 | A1 | 8/2010 | Nadkarni et al. |
| 2010/0299757 | A1 | 11/2010 | Lee |
| 2010/0317371 | A1 | 12/2010 | Westerinen et al. |
| 2011/0039522 | A1 | 2/2011 | Partridge et al. |
| 2011/0066383 | A1* | 3/2011 | Jangle et al. ................... 702/19 |
| 2011/0070863 | A1 | 3/2011 | Ma et al. |

FOREIGN PATENT DOCUMENTS

| GB | 2434504 A | 7/2007 |
| WO | WO2008054135 A1 | 5/2008 |

OTHER PUBLICATIONS

Calderon, et al., "Recognition and Generation of Motion Primitives with Humanoid Robots", 2009 IEEE/ASME International Conference on Advanced Intelligent Mechatronics Suntec Convention and Exhibition Center, Singapore, Jul. 14-17, 2009, pp. 917-922.
Ghasemzadeh, et al., "Collaborative Signal Processing for Action Recognition in Body Sensor Networks: A Distributed Classification Algorithm Using Motion Transcripts," IPSN'10, Apr. 12-16, 2010, Stockholm, Sweden, pp. 244-255.
Huynh, et al., "Analyzing Features for Activity Recognition," Joint sOc-EUSAI conference, Grenoble, Oct. 2005, 6 pages.
Valtonen M. et al., "Proactive and Adaptive Fuzzy Profile Control for Mobile Phones", percom, pp. 1-3, 2009 IEEE International Conference on Pervasive Computing and Communications, 2009.

(Continued)

*Primary Examiner* — Alan Chen
(74) *Attorney, Agent, or Firm* — Kilpatrick Townsend & Stockton LLP

(57) ABSTRACT

Example methods, apparatuses, or articles of manufacture are disclosed herein that may be utilized, in whole or in part, to facilitate or support one or more operations or techniques for machine learning of situations via pattern matching or recognition.

53 Claims, 5 Drawing Sheets

(56) References Cited

OTHER PUBLICATIONS

Yang, et al., "Distributed Recognition of Human Actions Using Wearable Motion Sensor Networks," Journal of Ambient Intelligence and Smart Environments (2009), pp. 1-13.

Yang, et al., "Distributed Segmentation and Classification of Human Actions Using a Wearable Motion Sensor Network," Computer Society Conference on Computer Vision and Pattern Recognition Workshops, 2008. CVPRW '08, pp. 1-8.

International Search Report and Written Opinion—PCT/US2012/021743—ISA/EPO—May 14, 2012.

* cited by examiner

LEARNING SITUATIONS VIA PATTERN MATCHING

CROSS-REFERENCE TO RELATED APPLICATIONS

The present application claims priority to U.S. Provisional Patent Application Ser. No. 61/434,400, entitled "Learning Situations via Pattern Matching," filed on Jan. 19, 2011, which is assigned to the assignee hereof and which is expressly incorporated herein by reference. Additionally, U.S. patent application Ser. No. 13/269,513, filed Oct. 7, 2011, entitled "MACHINE LEARNING OF KNOWN OR UNKNOWN MOTION STATES WITH SENSOR FUSION" is being filed concurrently, the entire disclosure of which is hereby incorporated by reference.

BACKGROUND

1. Field

The present disclosure relates generally to machine learning and, more particularly, to machine learning of situations via pattern matching or recognition for use in or with mobile communication devices.

2. Information

Mobile communication devices, such as, for example, cellular telephones, smart telephones, portable navigation units, laptop computers, personal digital assistants, or the like are becoming more common every day. These devices may include, for example, a variety of sensors to support a number of host applications. Typically, although not necessarily, sensors are capable of converting physical phenomena into analog or digital signals and may be integrated into (e.g., built-in, etc.) or otherwise supported by (e.g., stand-alone, etc.) a mobile communication device. For example, a mobile communication device may feature one or more accelerometers, gyroscopes, magnetometers, gravitometers, ambient light detectors, proximity sensors, thermometers, location sensors, microphones, cameras, etc., capable of measuring various motion states, locations, positions, orientations, ambient environments, etc. of the mobile device. Sensors may be utilized individually or may be used in combination with other sensors, depending on an application.

A popular and rapidly growing market trend in sensor-enabled technology includes, for example, intelligent or smart mobile communication devices that may be capable of understanding what associated users are doing (e.g., user activities, intentions, goals, etc.) so as to assist, participate, or, at times, intervene in a more meaningful way. Integration of an ever-expanding variety or suite of embedded or associated sensors that continually capture, obtain, or process large volumes of incoming information streams may, however, present a number of challenges. These challenges may include, for example, multi-sensor parameter tracking, multi-modal information stream integration, increased signal pattern classification or recognition complexity, background processing bandwidth requirements, or the like, which may be at least partially attributed to a more dynamic environment created by user mobility. Accordingly, how to capture, integrate, or otherwise process multi-dimensional sensor information in an effective or efficient manner for a more satisfying user experience continues to be an area of development.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
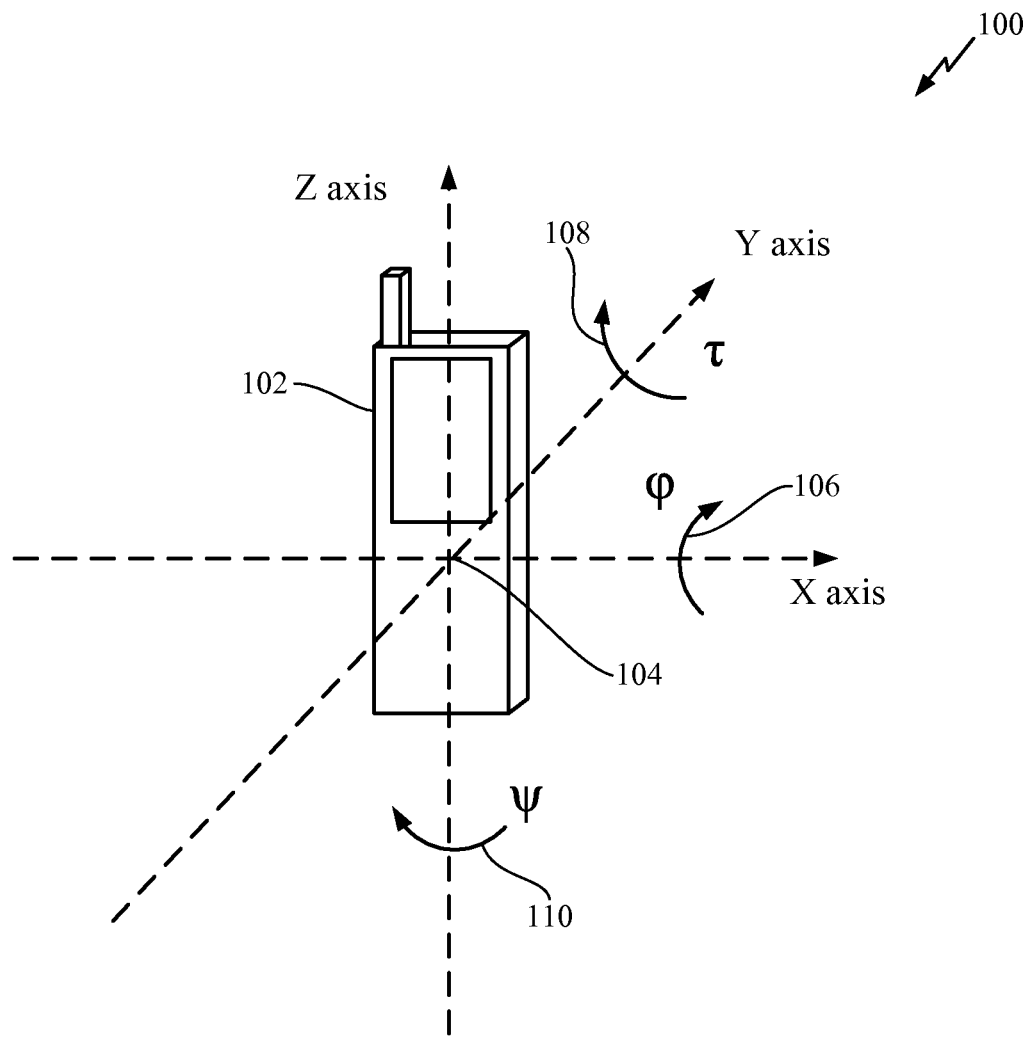
FIG. 1 is an example coordinate system that may be used for machine learning of situations via pattern matching or recognition according to an implementation.

Example implementations relate to machine learning of known or unknown motion states with sensor fusion. In one implementation, a method may comprise monitoring, at a mobile device, input signals from a plurality of information sources associated with the mobile device; detecting at least one condition based, at least in part, on at least one of the monitored input signals; identifying a first pattern based, at least in part, on the at least one detected condition; and fixing a subset of varying parameters associated with the first pattern, the varying parameters derived, at least in part, from the monitored input signals.

In another implementation, an apparatus may comprise a mobile device comprising at least one processor to monitor input signals from a plurality of information sources associated with the mobile device; detect at least one condition based, at least in part, on at least one of the monitored input signals; identify a first pattern based, at least in part, on the at least one detected condition; and fix a subset of varying parameters associated with the first pattern, the varying parameters are being derived, at least in part, from the monitored input signals.

In yet another implementation, an apparatus may comprise means for monitoring, at a mobile device, input signals from a plurality of information sources associated with the mobile device; means for detecting at least one condition based, at least in part, on at least one of the monitored input signals; means for identifying a first pattern based, at least in part, on the at least one detected condition; and means for fixing a subset of varying parameters associated with the first pattern, the varying parameters are being derived, at least in part, from the monitored input signals.

In yet another implementation, an article may comprise a non-transitory storage medium having instructions stored thereon executable by a special purpose computing platform at a mobile device to monitor input signals from a plurality of information sources associated with the mobile device; detect at least one condition based, at least in part, on at least one of the monitored input signals; identify a first pattern based, at least in part, on the at least one detected condition; and fix a subset of varying parameters associated with the first pattern, the varying parameters derived, at least in part, from the monitored input signals. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for learning one or more situations via pattern matching or recognition for use in or with a mobile communication device. As used herein, "mobile device," "mobile communication device," "wireless device," "handheld device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information over suitable communications networks according to one or more communication protocols. As a way of illustration, special purpose mobile communication devices, which may herein be called simply mobile devices, may include, for example, cellular telephones, satellite telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be utilized in connection with machine learning of situations via pattern matching or recognition, and that claimed subject matter is not limited in this regard.

As previously mentioned, a mobile device may comprise a suite or a variety of sensors providing measurement signals that may be processed in some manner, such as via a suitable application processor, for example, so as to draw a number of inferences with respect to an associated user activity, intention, goal, or the like. As will be described in greater detail below, in some instances, an inference may include a certain context, which may characterize or specify a particular situation or circumstances relevant to a user experience. Particular examples of a context may include, for example, traveling between home and a place of work, being on a plane or vehicle, participating in a meeting, having lunch, exercising in a gym, sending or receiving a text message or e-mail, or the like, though claimed subject matter is not so limited. As described below, a mobile device may utilize one or more measurement signals obtained or received from certain sensors specifying a particular situation, for example, while considering signals from other sensors so as to make a more complete, accurate, or otherwise sufficient inference of what an associated user is doing, about to do, or the like. A mobile device may, for example, make an inference while being co-located with a portion of the user's body, such as via a suitable sensor-enabled body area network (e.g., in a pocket, belt clip, armband, etc.), just to illustrate one possible implementation. At times, an inference may be made in connection with an input of a user operating a mobile device in some manner, such as, for example, sending an e-mail, silencing a ringer, muting a call, or the like, which may facilitate or support learning or recognition of situations via pattern matching, as will also be seen.

In some instances, a mobile device may, for example, utilize or employ, in whole or in part, one or more suitable pattern matching or recognition techniques to classify sensor-related observations in order to make a number of relevant or otherwise sufficient inferences with respect to user activities, intentions, goals, situations, or the like. For example, a suitable application processor (e.g., of a mobile device, etc.) may associate one or more varying parameters of interest or so-called variables received or derived from one or more information streams with one or more user-related mobility patterns or other sensor-captured patterns that may be indicative of whether an associated user is in a particular context. By way of example but not limitation, varying parameters or variables of interest may comprise, for example, an acceleration, vibration, gyroscopic rotation, wireless connectivity, luminous intensity of the ambient light, temperature, variance, velocity, background noise level, or the like. Particular examples of certain pattern matching or recognition techniques that may be used, in whole or in part, in connection with machine learning of various situations will be described in greater detail below.

As was indicated, a mobile device may include, for example, a number of sensors, such as one or more accelerometers, gyroscopes, magnetometers, ambient light detectors, proximity sensors, cameras, microphones, thermometers, or the like. In addition, a mobile device may feature a number of devices that may be used, at least in part, for sensing, such as Global Positioning System (GPS), Wireless Fidelity (WiFi), Bluetooth™-enabled devices, or the like. Thus, it should be appreciated that "sensor," "sensing device," or the plural form of such terms may be used interchangeably herein. These sensors or sensing devices, as well as other possible sensors or devices not listed, may be capable of providing signals for use by a variety of host applications (e.g., navigation, location, communication, etc.) while measuring various motion states, locations, positions, orientations, ambient environments, etc. of a mobile device using appropriate techniques.

An accelerometer, for example, may sense a direction of gravity toward the center of the Earth and may detect or measure a motion with reference to one, two, or three directions often referenced in a Cartesian coordinate space as dimensions or axes X, Y, and Z. Optionally or alternatively, an accelerometer may also provide measurements of magnitude of various accelerations, for example. A direction of gravity may be measured in relation to any suitable frame of reference, such as, for example, in a coordinate system in which the origin or initial point of gravity vectors is fixed to or moves with a mobile device. An example coordinate system that may be used, in whole or in part, to facilitate or support one or more processes in connection with machine learning of situations via pattern matching or recognition will be described in greater detail below in connection with FIG. 1. A gyroscope may utilize the Coriolis effect and may provide angular rate measurements in roll, pitch, or yaw dimensions and may be used, for example, in applications determining heading or azimuth changes. A magnetometer may measure the direction of a magnetic field in X, Y, Z dimensions and may be used, for example, in sensing true North or absolute heading in various navigation applications.

Following the above discussion, measurement signals received or obtained from a variety of sources of information, such as, for example, one or more sensors, applications, user actions, etc. may be integrated in some manner so as to make a more complete, accurate, or otherwise sufficient inference or classification of a motion state, activity, intention, goal, situation, etc. of an associated user. FIG. 1 illustrates an implementation of an example coordinate system 100 that may be used, in whole or in part, to facilitate or support one or more operations or techniques for machine learning of situation via pattern matching or recognition for use in or with a mobile device, such as a mobile device 102, for example. As illustrated, example coordinate system 100 may comprise, for example, three-dimensional Cartesian coordinate system, though claimed subject matter is not so limited. In this illustrated example, one or more translational aspects or characteristics of motion of mobile device 102 representing, for example, acceleration vibration may be detected or measured, at least in part, by a suitable accelerometer, such as a 3D accelerometer, with reference to three dimensions or axes X, Y, and Z relative to an origin 104 of example coordinate system 100. It should be appreciated that example coordinate system 100 may or may not be aligned with a body of mobile device 102. It should also be noted that in certain implementations a non-Cartesian coordinate system may be used or that a coordinate system may define dimensions that are mutually orthogonal.

One or more rotational aspects or characteristics of motion of mobile device 102, such as orientation changes about gravity, for example, may also be detected or measured, at least in part, by a suitable accelerometer with reference to one or two dimensions. For example, rotational motion of mobile device 102 may be detected or measured in terms of coordinates ($\phi$, $\tau$), where phi ($\phi$) represents roll or rotation about an X axis, as illustrated generally by arrow at 106, and tau ($\tau$) represents pitch or rotation about an Y axis, as illustrated generally at 108. Accordingly, here, a 3D accelerometer may detect or measure, at least in part, a level of acceleration vibration as well as a change about gravity with respect to roll or pitch dimensions, for example, thus, providing five dimensions of observability (X, Y, Z, $\phi$, $\tau$). It should be understood, however, that these are merely examples of various motions that may be detected or measured, at least in part, by an accelerometer with reference to example coordinate system 100, and that claimed subject matter is not limited to these particular motions or coordinate system.

At times, one or more rotational aspects or characteristics of motion of mobile device 102 may, for example, be detected or measured, at least in part, by a suitable gyroscope capable of providing adequate degrees of observability, just to illustrate another possible implementation. For example, a gyroscope may detect or measure rotational motion of mobile device 102 with reference to one, two, or three dimensions. Thus, gyroscopic rotation may, for example, be detected or measured, at least in part, in terms of coordinates ($\phi$, $\tau$, $\psi$), where phi ($\phi$) represents roll or rotation 106 about an X axis, tau ($\tau$) represents pitch or rotation 108 about a Y axis, and psi ($\psi$) represents yaw or rotation about a Z axis, as referenced generally at 110. A gyroscope may typically, although not necessarily, provide measurements in terms of angular acceleration or vibration (e.g., a change in an angle per unit of time squared), angular velocity (e.g., a change in an angle per unit of time), or the like. Of course, details relating to various motions that may be detected or measured, at least in part, by a gyroscope with reference to example coordinate system 100 are merely examples, and claimed subject matter is not so limited.

In certain implementations, mobile device 102 may include one or more ambient environment or like sensors, such as, for example, an ambient light detector, a proximity sensor, a temperature sensor, a barometric pressure sensor, or the like. For example, a proximity sensor may typically comprise an infrared (IR) emitter-receiver pair placed sufficiently closely on mobile device 102 so as to detect a presence of nearby objects, measure a distance to such objects, etc. without physical contact. A proximity sensor may be often featured in mobile devices to turn off a display while not in use, for example, deactivate a touch screen to avoid unwanted input during a call, or the like. Certain implementations of mobile device 102 may feature an ambient light detector to help in adjusting a touch screen backlighting or visibility of a display in a dimly lit environment, for example, via measuring an increase in luminous intensity of the ambient light. Ambient environment sensors are generally known and need not be described here in greater detail.

It should be appreciated that in some example implementations mobile device 102 may include other types of sensors or sensing devices beyond sensors or devices listed herein so as to facilitate or support machine learning of situations via a pattern matching or recognition. For example, mobile device 102 may include one or more digital cameras that may track optical motion of an object or associated environment so as to make a context-relevant inference, facilitate or support context recognition, or the like. In addition, mobile device 102 may be equipped with a microphone, for example, and may be capable of sensing an audio that may be associated with a particular context or activity of a user, such as, being in a gym, having a conversation, listening to the music, cooking or making coffee, watching a movie, or the like, as another possible example. In some instances, mobile device 102 may comprise one or more devices that may be used, at least in part, for sensing, such as, for example, GPS, WiFi, Bluetooth™-enabled devices, as previously mentioned. For example, a GPS-enabled device in conjunction with measurements from an accelerometer may enable mobile device 102 to make an inference with respect to a mode of transportation of a user, such as being in a car or riding a bike, taking a bus or train, or the like. Of course, these are merely examples relating to sensors that may be used, at least in part, in connection with machine learning of situations via pattern matching or recognition, and claimed subject matter is not so limited.

As alluded to previously, how to design or implement a machine learning approach for mobile devices to be able to understand what associated users are doing (e.g., user activities, intentions, goals, situations, etc.) so as to assist, participate, or, at times, intervene in a more meaningful way, for example, continues to be an area of development. In some instances, a learning approach, such as in supervised or unsupervised machine learning, for example, may include one or more signal-related pattern recognition techniques (e.g., statistical, structural, etc.) that may help to classify one or more sensor-related observations, as was indicated. Typically, although not necessarily, signal-related patterns may be specified or observed in a multi-dimensional space with respect to multiple sources of information. Thus, one or more patterns to be identified may, for example, be represented via one or more vectors of observations in multiple dimensions. As will be seen, in some instances, dimensions may correspond, for example, to a signal attribute (e.g., represented via a variable, etc.) in a set of information sources that may be monitored in some manner. At times, pattern recognition techniques may, for example, employ or utilize, at least in part, one or more pattern-matching templates, but some prior knowledge of an applicable domain may be needed or otherwise useful to find variations that may fit a somewhat generalized template, if any. Typical approaches to pattern matching or recognition may include, for example, utilizing or otherwise considering a relatively rigid specification of a particular pattern to be found. For example, at times, a match may imply that an identical pattern is found or located in one or more testing or training datasets, suitable information repositories, or the like. In addition, one or more suitable distance metrics may, for example, be applied in some manner, in whole or in part, to facilitate or support approximate pattern matching or recognition.

Since typical pattern recognition approaches generally employ processes or algorithms that work with a fixed known number of information sources, pattern recognition with respect to a multi-dimensional information stream acquired or obtained via a suite of sensors may present a number of challenges. These challenges may include, for example, detecting or "picking up" patterns from a large number of information sources with an unknown or different subset of sources being relevant to different situations or contexts. In other words, in some instances, it may be somewhat difficult to detect or recognize an existing pattern if such a pattern is not pre-defined or pre-specified in some manner for a certain information source. Another challenge with typical approaches may be, for example, identifying one or more relevant situations and learning patterns that are correlated with or correspond to these relevant situations. Consider, for example, a multi-dimensional information stream captured or obtained via a variety of sensors with respect to a typical "return-home-after-work" experience of a user.

Figure 2:
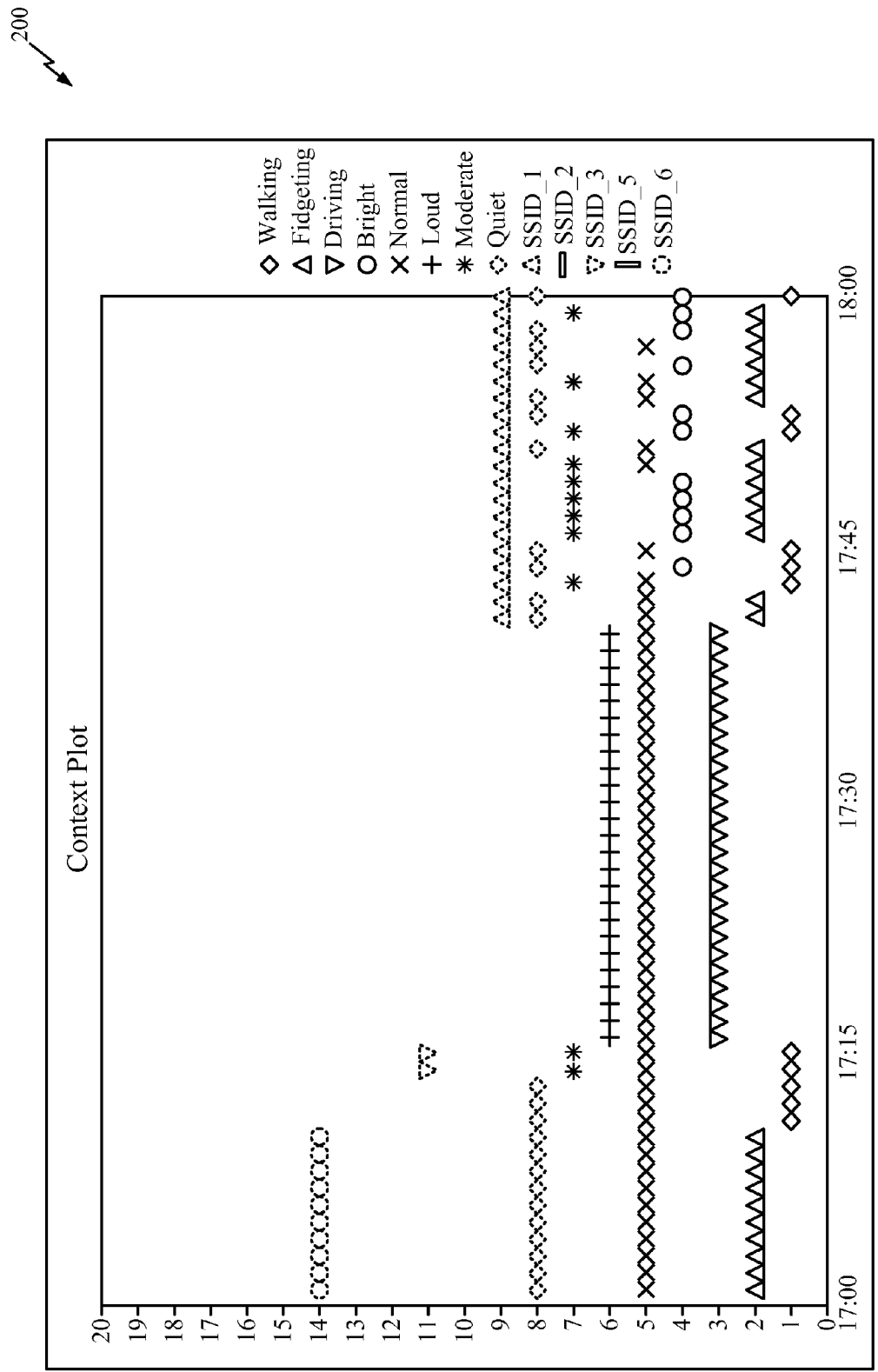
FIG. 2 is an example context plot of a multi-dimensional sensor information stream according to an implementation.

By way of example but not limitation, an example context plot 200 of a multi-dimensional sensor information stream captured or obtained in connection with certain simulations or experiments is illustrated in FIG. 2. For this example, a multi-dimensional sensor information stream is captured via a suite of sensors, such as, for example, an accelerometer, WiFi, ambient light detector, and microphone for an "Office→Parking Lot→Driving→Home" routine (e.g., between 5 and 6 p.m., etc.) of a user. Here, an acceleration vibration may, for example, indicate that a user is driving or walking, a lost WiFi connectivity may indicate that a user is no longer at work (e.g., disconnected with a work-related network or service set identifier (SSID), etc.), an ambient light detector may sense that a user is outside or in a brighter outdoor environment, a microphone may sense a background noise for context-relevant inference (e.g., driving, etc.), or the like, just to illustrate a few examples. Claimed subject matter is not so limited, of course.

As seen, because of an increased dimensionality of an information stream due, at least in part, to a large variation of sensor-tracked parameters indicative of user-related events or conditions (e.g., walking, driving, fidgeting, etc.), finding exact or approximate matches to a template, pre-defined or otherwise, may be rather difficult. In other words, at times, a relatively large number of varying parameters or variables associated with a multi-dimensional sensor information stream may be difficult to track, correlate, process, associate, etc., which in turn may limit the ability of a mobile device to react to different situations, make relevant inferences, or otherwise be aware of its context with sufficient accuracy. In addition, certain varying parameters or variables may be irrelevant to a particular user situation or context, in which case it may be important or otherwise useful to identify irrelevant or incidental variables so as to ignore or omit one or more corresponding irrelevant patterns from consideration, as described below.

As alluded to previously, continually tracking or monitoring all or most varying parameters or variables that may be associated with a multi-dimensional stream of sensor information may be a computationally intensive, resource-consuming, at times intractable, or otherwise less than efficient or effective approach for pattern matching or recognition. Accordingly, as will be seen, rather than continually tracking all or most information stream-related variables to match or recognize all or most possible or existing patterns, a mobile device may, for example, monitor one or more conditions or events of interest. By way of example but not limitation, a condition or event may include, for example, a time of day, day of week, state or action of a host application, action of a user operating a mobile device (e.g., silencing a ringer, muting a call, sending a text message, etc.) or the like, just to name a few examples. As will be described in greater detail below, in an implementation, upon or after detecting these one or more conditions or events, a mobile device may, for example, selectively initiate a process to attempt to recognize a particular signal-related pattern that occurs in connection with the detected condition or event.

More specifically, a subset of one or more varying parameters or variables associated with a condition or event may, for example, be fixed in some manner and stored in a suitable database. As described below, such a subset may comprise, for example, a distinct signal-related pattern corresponding to a certain detected condition or event, just to illustrate one possible implementation. Such a condition or event-related pattern may be fixed, for example, by associating corresponding parameters or variables having a particular, distinct, or otherwise suitable pattern to represent the condition or event. In the next or otherwise suitable occurrence of such a condition or event-related pattern, an electronic "snapshot" of one or more other co-occurring signal-related patterns representative of associated sensors' behavior may be captured. A suitable processor may then look or search for a pattern match, exact or approximate, in one or more other signal-related patterns every time a condition or event-related pattern occurs, for example, by utilizing a "snapshot," in whole or in part, using any suitable pattern matching processes or algorithms.

To illustrate, a user may silence a ringer or mute a call, which may comprise a condition or event of interest, for example, and at that moment a "snapshot" of one or more sensors associated with a monitored information stream and their respective electronic behavior (e.g., associated signal patterns, etc.) may be captured and stored in a suitable database. As will be seen, a monitored information stream may comprise, for example, one or more input signals obtained by one or more sensors associated with a mobile device and defining one or more context-related information streams. A mobile device may then search for a pattern that co-occurs with silencing a call, for example, in a set of stored signal-related patterns every time the call is silenced and may initiate an appropriate action, such as routing a call to voice mail. In other words, by fixing a subset of varying parameters or variables (e.g., dimensions, etc.) representing a particular condition or event (e.g., silencing a ringer, muting a call, etc.), a set of variables associated with a multi-dimensional sensor information stream may be advantageously reduced. This may make pattern matching more tractable or otherwise allow for a more effective or efficient pattern recognition since a pattern matching process is performed in a remaining or reduced set of variables. In turn, more tractable approach may facilitate or support machine learning (e.g., via a processor associated with a mobile device, etc.), for example, of a condition or event of interest characterizing a particular situation relevant to a user activity, intention, goal, or the like, such that an appropriate action may be initiated by a mobile device in real time. For example, a mobile device may ring louder in response to an incoming call if a learned situation indicates a noisy ambient environment, or may silence a ringer and route an incoming call to voice mail if a learned situation indicates that a user may not want to be disturbed, or may launch an application if a learned situation indicates a user's intent to use the application, or the like. In this context, "real time" may refer to an amount of timeliness of data or information, which may have been delayed by an amount of time attributable to electronic communication as well as other information or signal processing. Of course, details relating to a particular condition or event, user actions, or corresponding patterns are merely examples, and claimed subject matter is not limited in these respects.

As will be described in greater detail below, a "snapshot" representative of a signal behavior captured in connection with a condition or event of interest may comprise or otherwise be correlated with any one of several types of different signal-related patterns. In some instances, particular types of patterns may include, for example, one or more temporal patterns, action-correlated patterns, transition-correlated patterns, or relational patterns, though claimed subject matter is not so limited. For example, any suitable combination of these patterns as well as other patterns not listed may also be utilized, in whole or in part.

A temporal pattern may comprise, for example, a signal-related pattern defined, at least in part, by a time-related parameter or characteristic. For example, a temporal pattern may be associated with a repetitive situation likely to occur several times per day, on a daily basis, or the like. It should be appreciated that a temporal pattern may occur aperiodically, meaning that its repetition period may be unknown, such as, for example, several times per day but at unknown times, only on weekdays, one day per week, or the like. In some instances, a temporal pattern may comprise or be associated with one or more events or conditions that exist or last for a certain threshold duration. A threshold duration may be determined experimentally and pre-defined, for example, or otherwise dynamically defined in some manner. In some instances, a threshold may comprise, for example, a duration relevant to a detected condition, just to illustrate one possible implementation. By way of example but not limitation, in the context of a user driving, for example, a relevant threshold may be in a range of tens of minutes (e.g., between 10 and 15, etc. min.) rather than minutes since people typically, although not necessarily, drive for more than a minute at a time prior to parking Claimed subject matter is not limited to such a threshold duration, of course.

An action-correlated pattern may comprise, for example, a signal-related pattern that may associate a particular context with a user behavior or action. For example, one or more user actions may be observed or tracked in some manner and may be subsequently evaluated to determine whether there is a correlation between a certain action and a particular context. As a way of illustration, a pattern of a user ignoring or muting incoming calls, for example, may be tracked or evaluated to determine whether the user is in a meeting or otherwise not to be interrupted.

A transition-correlated pattern may comprise, for example, a signal-related pattern that may characterize or define an observed transition between contexts, such as a transition between a user driving in a car and walking in a parking lot. A relational pattern may comprise, for example, a signal-related pattern that may characterize or define a possible relationship between contexts. For example, in case of a user driving, the context "location" may continually change from X→X', Y→Y', etc., while the context "driving" may remain the same. Particular examples of various signal-related patterns or respective pattern identification techniques will be described in greater detail below.

As alluded to previously, a signal-related pattern may comprise, for example, a number of varying parameters or variables of interest that may be represented via one or more signal sample values derived from a multi-dimensional stream of sensor-related information. In some instances, signal sample values may be derived, for example, from measurement signals obtained via one or more associated sensors using appropriate techniques. In an implementation, based, at least in part, on one or more varying parameters or variables, one or more suitable patterns may be detected or identified in a suitable manner, such as, for example, in connection with an electronic "snapshot" of signal-related behavior discussed above. For example, a temporal pattern may be identified, at least in part, via monitoring signal sample values representative of different variables that are repetitive at or around a given situation, such as a time of the day, day of the week, every given number of hours or minutes, or the like, though claimed subject matter is not so limited. As previously mentioned, it should be appreciated that a pattern may last or exist for a threshold duration relevant to a certain user-related condition, such as a certain number of minutes for driving, hours for watching a movie, or the like. It should also be noted that, at times, unless a pattern lasts or exists for a minimum or threshold amount of time, for example, derived signal sample values may not comprise or otherwise be indicative of an actual pattern, as was also indicated.

Figure 3:
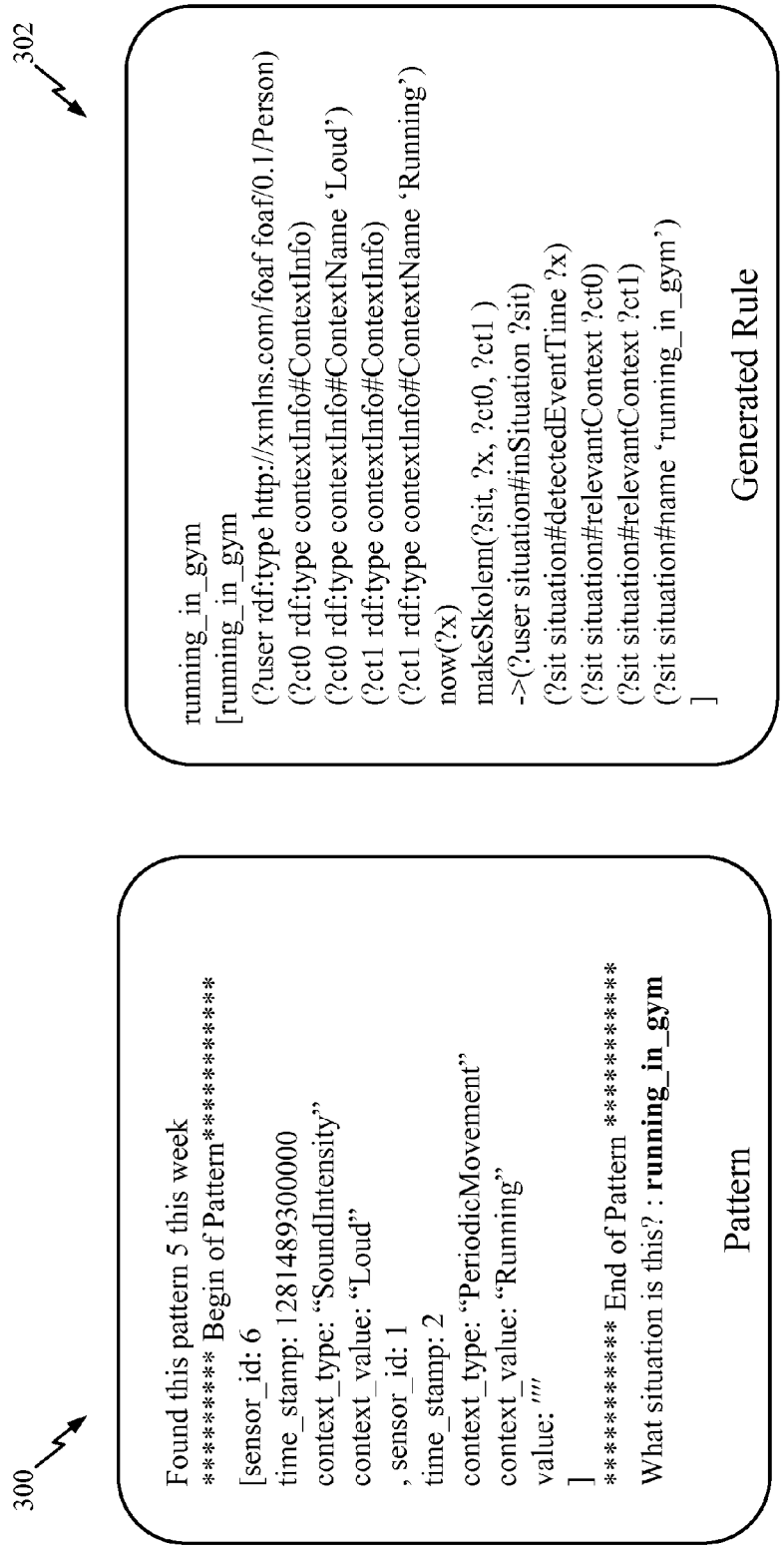
FIG. 3 is an example temporal pattern and an example generated rule according to an implementation.

In an implementation, a temporal pattern may correspond to or correlate with a particular situation if, for example, a given subset of variables has repetitive values in time. At times, identifying a subset of variables that may be relevant to a particular user situation may be challenging, however, if a cardinality of the subset is unknown. For purposes of explanation, typically, although not necessarily, a cardinality of a set may refer to a measure of a number of elements in a set. As discussed above, identifying a repetitive pattern within a smaller number of variables due, at least in part, to fixing at least one subset of variables of a multi-dimensional information stream, for example, may, therefore, prove beneficial. A particular example of a temporal pattern 300 observed via repetitive values in connection with one particular simulation or experiment and a rule 302 applicable or relevant to a particular user situation derived or generated based, at least in part, on the temporal pattern is illustrated in FIG. 3. As seen, repetitive values derived from a context-related multi-dimensional sensor stream may comprise, for example, values sampled via an accelerometer, a microphone, and a location sensor (e.g., GPS-enabled, etc.) relevant to identifying the situation "running in a gym," which may be derived and subsequently designated as a rule. For this example, accelerometer, microphone, and location sensor-related variables have repetitive values relevant to identifying the situation while a time of the day may change in some manner, such as every day, just to illustrate one possible implementation. It should be noted that ensuring relatively large or rich dimensionality of a sampled information stream may facilitate or support learning of various situations relevant to a user experience via a larger variety of corresponding patterns. Of course, details relating to a temporal pattern or pattern identification are merely examples to which claimed subject matter is not limited.

In an implementation, an action-correlated pattern may, for example, map a correspondence to the same or similar user action if one or more variables exhibit a pattern in themselves, such as in the case of a user silencing one or more incoming calls while in a meeting, mentioned above. Thus, an action-correlated pattern may, for example, be identified or detected by keeping track of one or more user actions in a database of events and keeping track of all or some monitored sources in a suitable database as a continuous "context stream." A context stream may comprise, for example, multi-dimensional sensor information (e.g., walking, driving, etc.), pre-processed or otherwise, or higher-level situations (e.g., being in a meeting, driving to work, walking in a parking lot, etc.). Here, a "snapshot" of a context stream may, for example, be captured in some manner, such as at or upon occurrence of a given condition or event of interest, as previously mentioned. In some instances, it may be useful to consider, for example, a history of a context stream for some duration prior to an occurrence of a condition or event of interest. A "snapshot" comprising a correlation between a condition or event and a context stream may be stored in a suitable database, such as in an event correlation database, as one possible example. An event correlation database may, for example, be subsequently accessed and analyzed for pattern matching or recognition with respect to one or more context streams corresponding to or correlating with the same event that occurred multiple or otherwise sufficient number of times.

In certain implementations, one or more tunable parameters may be utilized, at least in part, in connection with machine learning of situations, action-correlated or otherwise, via pattern matching or recognition. An example of a tunable parameter may include a duration of a history relevant to an action-correlated situation, though claimed subject matter is not so limited. It should be noted that a tunable parameter may be different for different situations. For example, an instantaneous or otherwise suitable set of contexts may be relevant in some situations, while in other situations captured duration of history may be required or otherwise useful to find a certain action-correlated pattern. Similarly to a temporal pattern, an action-correlated pattern may suffer or otherwise be affected in some manner by a number of irrelevant information sources. As such, it may be useful to determine whether certain sensor-related information associated with a multi-dimensional information stream is relevant or incidental to a particular user situation. For example, a set of contributing contexts corresponding to a particular situation may be presented to a user so as to identify a subset of relevant contextual information or sources. Some examples of identifying irrelevant information sources with respect to a multi-dimensional information stream will be described in greater detail below.

Action-correlated pattern recognition may, for example, be useful in identifying one or more user actions in various situations without tagging or labeling situations themselves. For example, knowing that a user silences one or more incoming calls if a motion state corresponds to "running" that exists or lasts over a certain threshold duration (e.g., more than 10 minutes, etc.) may be sufficient even if a mobile device does not know that the user is "exercising in a gym." In addition, here, a semi-supervised learning approach may, for example, be advantageously employed by involving a user in labeling a detected condition or event of interest so as to allow relatively higher-level reasoning with respect to a discovered situation. Of course, details relating to a particular action-correlated pattern are merely examples to which claimed subject matter is not limited.

As previously mentioned, one or more transition-correlated patterns may be used, at least in part, to facilitate or support machine learning of situations via pattern matching or recognition. A transition between contexts may, for example, be an indication of a condition or event of interest corresponding to a particular situation relevant to a user experience. For example, a number of appropriate or applicable information sources may be monitored to determine or infer a destination if a motion state of an associated user changes from "walking" to "driving." Information sources may be monitored to detect a condition or event of interest in any suitable dimension corresponding to an attribute or variable in a suitable or applicable set, for example, such that if a transition in any dimension occurs, a state or behavior of other attributes or variables is captured. As such, a pattern in the rest of attributes or variables may capture a relevant transition-based situation, such as, for example, in connection with an electronic "snapshot" discussed above. Here, one or more irrelevant sources may, for example, also be identified or filtered out, as described below, so as to facilitate or support meaningful pattern identification.

As alluded to previously, a relational pattern may facilitate or support situation learning, for example, by defining or characterizing a possible relationship between two or more variables of interest rather than a pattern in values, absolute or otherwise, of these variables. To illustrate, a change in location from $X \rightarrow X'$ (e.g., via a changed address, etc.) occurring if a received WiFi-enabled SSID remains the same, for example, and if a situation "in the office" changes to "in the meeting" may express a pattern corresponding to "attending a meeting in another building." As another possible example, a change in a motion state, such as from jumping to jogging, for example, while a location remains unchanged may be indicative of a situation corresponding to "being in a gym." Claimed subject matter is not limited to particular patterns or situations illustrated, of course.

In some instances, a relational pattern may, for example, be identified, at least in part, via one or more associated characteristics. For example, certain variables associated with a relational pattern may have a so-called "constant context" occurring for at least a minimum duration of time. To illustrate, the context "driving" may occur or exist for at least 15 minutes, as previously mentioned. In addition, one or more variables associated with a relational pattern may exhibit or express a changing context, such as a continuous change in a location, for example, or change in a location from $X \rightarrow X'$ during the context "driving" (e.g., from the beginning to the end, etc.). Here, these observed variables may be considered, at least in part, as a suitable characteristic of a relational pattern. At times, a combination of a constant context for a certain duration, for example, along with a changed context of a particular detected pattern may comprise a characteristic of a relevant relational pattern. For example, "driving from home to work" may comprise a situation corresponding to the patterns of "driving" and "location change" discussed above, though claimed subject matter is not so limited.

It should be appreciated that in some instances certain a priori knowledge so as to distinguish between variables representative of a constant context and changing context may not be needed or otherwise useful. In addition, it should be noted that both constant and changing contexts may not co-occur or be present to identify a valid relational pattern. In some instances, a bi-directional relational pattern between variables, if present, may, for example, be modeled as an inverse relationship. For example, a constant motion state with a changing location or a constant location with a changing motion state may potentially be modeled as one or more inverse relational properties between variables "motion state" and "location." As such, one or more suitable pattern matching processes or algorithms may then be able to recognize or "pick up" either pattern in a less than exponential search of an applicable variable space. Of course, details relating to characteristics of a relational pattern or pattern identification are merely examples, and claimed subject matter is not so limited.

As previously mentioned, one or more relevant situations may be identified, at least in part, via one or more subsets of varying parameters or variables of interest. Identifying a relevant subset of variables corresponding to various situations, however, may present a number of challenges, statistical or otherwise. For example, identifying a relevant subset of variables may be somewhat similar to an exhaustive search with a non-deterministic polynomial-time hard-type (NP-hard) problem at its core, which may make it computationally expensive or otherwise more complex. In addition to these challenges, a lack or insufficiency of knowledge with respect to one or more logical operators may add to a complexity of the task. To illustrate, with a logical operator being unknown, for example, it may be difficult to determine whether the "location X AND motion state Y" or "location X AND NOT motion state Y" comprises a relevant pattern. Of course, claimed subject matter is not limited to these particular patterns or logical operators.

Accordingly, as discussed below, one or more approaches may be advantageously utilized, at least in part, to identify a subset of variables corresponding to various situations relevant to a user's experience. For example, in an implementation, one or more suitable variables may be individually monitored for patterns. At least one subset of variables of interest may be fixed, as discussed above, and one or more patterns in a second subset of variables may be identified, for example, if there is a pattern in the fixed subset of variables. By way of example but not limitation, an application processor associated with a mobile device may observe what other variables have patterns if a motion state corresponds, for example, to "driving," as one possible illustration. Here, a cardinality of one or more subsets may be described or defined, for example, via one or more suitable experimental parameters. For example, in some instances, a parameter similar to the value of "k" in a k-Nearest Neighbor classification process or algorithm in k-means clustering may be used, though claimed subject matter is not so limited. It should be appreciated that, at times, a fixed subset of a relatively smaller number of variables, such as of one variable, for example, may be less than sufficient to identify a related pattern. For example, fixing one variable associated with or corresponding to "driving" may not be helpful in meaningful pattern identification.

As previously mentioned, in some instances, to facilitate or support machine learning of situations via pattern matching, it may, for example, be helpful to identify one or more irrelevant patterns. As used herein, "irrelevant pattern" may refer to one or more signal-related patterns having a lesser likelihood of identifying a situation or circumstances relevant to a user's experience. For example, an irrelevant pattern may include the "sunny" condition, detected via an ambient light detector (e.g., an irrelevant source, etc.), with respect to identifying the situation "driving to work" if a user typically commutes during the daylight in a sun-dominated geographic area, such as Southern California (e.g., San Diego, etc.). Here, one or more variables derived from a multi-dimensional stream of sensor information captured or otherwise obtained via a respective accelerometer, GPS, and potentially a WiFi, for example, may have a higher likelihood of identifying the situation "driving to work." As such, these variables may prove more useful than variables derived in connection with measurement signals from an ambient light detector, which may be filtered out in a suitable manner or otherwise ignored. Of course, claimed subject matter is not limited to a particular pattern or information sources.

In an implementation, an irrelevant pattern may be identified, for example, via one or more human computation models suitable for a determination of one or more applicable semantic labels for context or situational information. For example, if a certain pattern of a particular context information is identified or encountered, a user may be presented with a choice to provide an appropriate label for such a pattern (e.g., via a user display, touch screen, voice command, etc.). A label may be provided, for example, in connection with a context labeling-type process, a situation labeling-type process, or any combination thereof. Appropriately labeled information may then be used, at least in part, in one or more training datasets in machine learning so as to allow the information to be fed back into a system for effective or efficient pattern recognition. Subsequently, similar patterns may be similarly labeled by a suitable processor, for example, such as in accordance with a label learned via an initial user input. Accuracy of one or more labels may be improved overtime via any suitable optimization techniques used, at least in part, in any suitable human computation models. An example of context labeling may include associating a specific accelerometer pattern with the context "surfing," for example, by providing other context, such as a camera view, location corresponding to a beach, detecting "wetness", or the like. Situation labeling may comprise, for example, seeking a user's input with respect to labeling a pattern of location, time of day, day of week, or WiFi network connectivity in connection with the situation "at work." As such, labeling meaningful context or situational information using, at least in part, one or more human computation models may, for example, allow for improvements in label consistency, complex pattern identification, contextual awareness, or the like for a more satisfying user experience. Thus, based, at least in part, on these one or more machine learning approaches, a pattern matching or recognition behavior of a suitable processor, such as a processor associated with a mobile device, for example, may be advantageously evolved.

Figure 4:
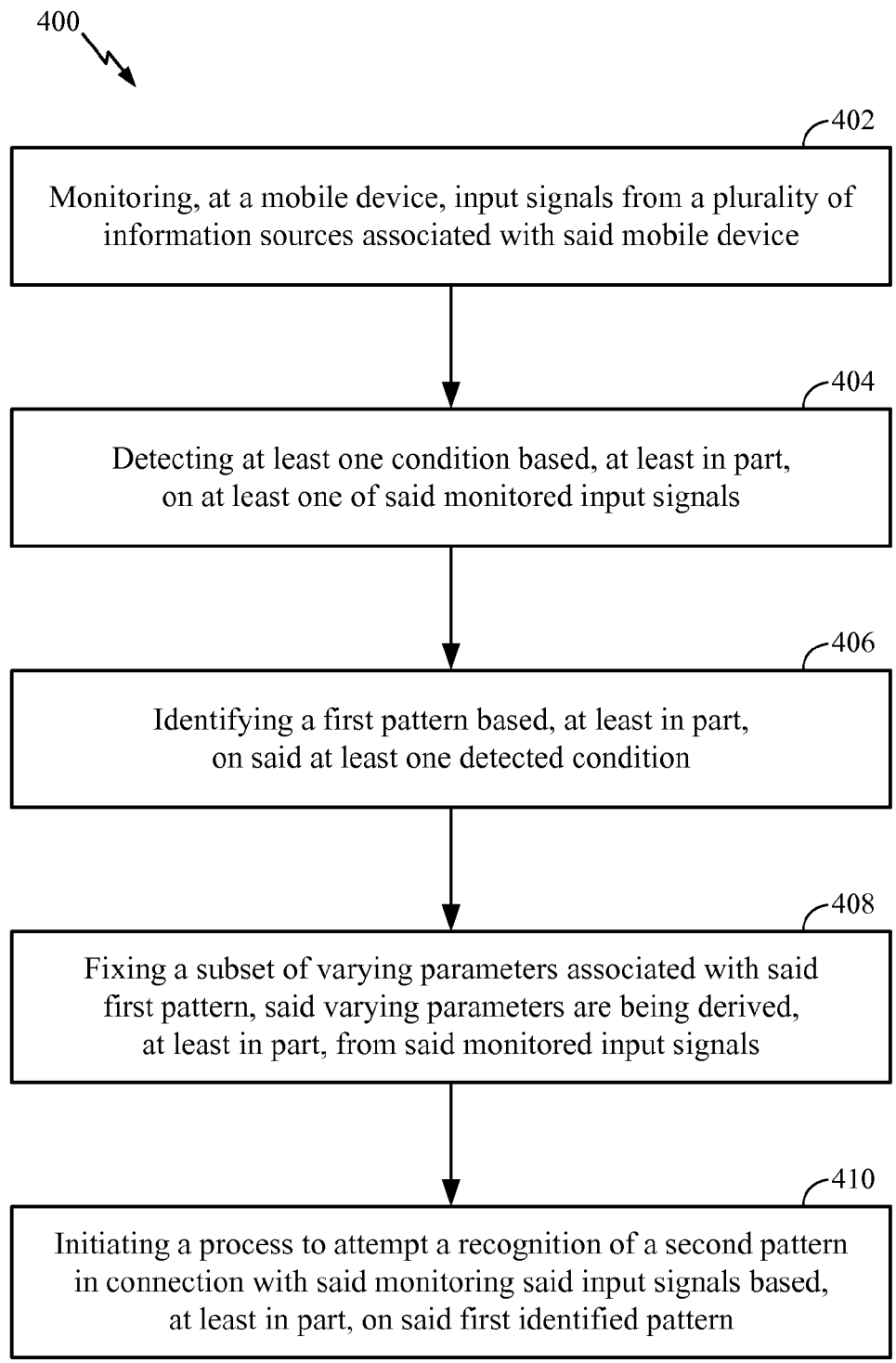
FIG. 4 is a flow diagram illustrating an implementation of an example process for machine learning of situations via pattern matching or recognition according to an implementation.

Attention is now drawn to FIG. 4, which is a flow diagram illustrating an implementation of an example process 400 that may be implemented, in whole or in part, for learning one or more situations via pattern matching or recognition for use in or with a mobile communication device. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 400 may begin at operation 402, for example, with monitoring, at a mobile device, one or more input signals from a plurality of information sources associated with such a mobile device. For example, input signals may be monitored, at least in part, via measurement signals derived from a multi-dimensional information stream sampled or obtained by a suite or variety of sensors or sensing devices associated with a mobile device. As previously mentioned, associated sensors may include, for example, one or more accelerometers, gyroscopes, magnetometers, ambient light detectors, proximity sensors, thermometers, location sensors, microphones, digital cameras, or the like. With regard to operation 404, at least one condition or event of interest may, for example, be detected based, at least in part, on at least one of monitored input signals. These one or more monitored input signals may, for example, define at least one context-related information stream, as was also indicated. By way of example but not limitation, a condition or event of interest may include, for example, a time of day, day of week, state or action of a host application, action of a user operating a mobile device (e.g., silencing a ringer, muting a call, sending a text message, etc.) or the like, just to name a few examples.

Having detected at least one condition or event, at operation 406, a first pattern may be identified based, at least in part, on at least one detected condition or event. For example, a first pattern may comprise a distinct signal-related pattern having one or more varying parameters or variables of interest that may be representative of or otherwise correspond to such a condition or event, as previously mentioned. At operation 408, one or more varying parameters or variables may be fixed in some manner, such as in a suitable subset having one or more signal sample values and may be stored in a suitable database. In some instances, a subset may be fixed, for example, by associating parameters or variables with a particular, distinct, or otherwise suitable pattern to represent a certain detected condition or event, as one possible example. By fixing a subset of varying parameters or variables representing a particular condition or event, a set of variables associated with a multi-dimensional sensor information stream may be advantageously reduced, as was also indicated.

With regard to operation 410, a process to attempt a recognition of a second pattern in connection with monitoring these input signals based, at least in part, on a first identified pattern may be initiated. For example, in the next or otherwise suitable occurrence of a first pattern (e.g., a condition or event-related pattern, etc.), a "snapshot" of a second pattern co-occurring with a first pattern and representative of associated sensors' behavior may be electronically captured. A "snapshot" may comprise, for example, a first pattern, a second pattern, a sensor information stream, or any combination thereof. A mobile device may perform a pattern matching, exact or approximate, with respect to a second pattern, for example, every suitable time a first or condition-related pattern occurs, for example, by utilizing such a "snapshot," in whole or in part. As was also indicated, "snapshot"-related pattern matching or recognition may be performed, at least in part, in connection with a several types of different patterns. For example, types of patterns may include a temporal pattern, an action-correlated pattern, a transition-correlated pattern, a relational pattern, or any combination thereof. As previously mentioned, this may make pattern matching or recognition more tractable, for example, since a process may be advantageously performed in a reduced set of varying parameters or variables derived from one or more input signals associated with a multi-dimensional sensor information stream. Having recognized a second pattern, a mobile device may initiate an appropriate action, such as ring louder in response to an incoming call in a noisy ambient environment, silence a ringer and routing an incoming call to voice mail if a user is in a meeting, launch an application if a user is intending to use, or the like.

Figure 5:
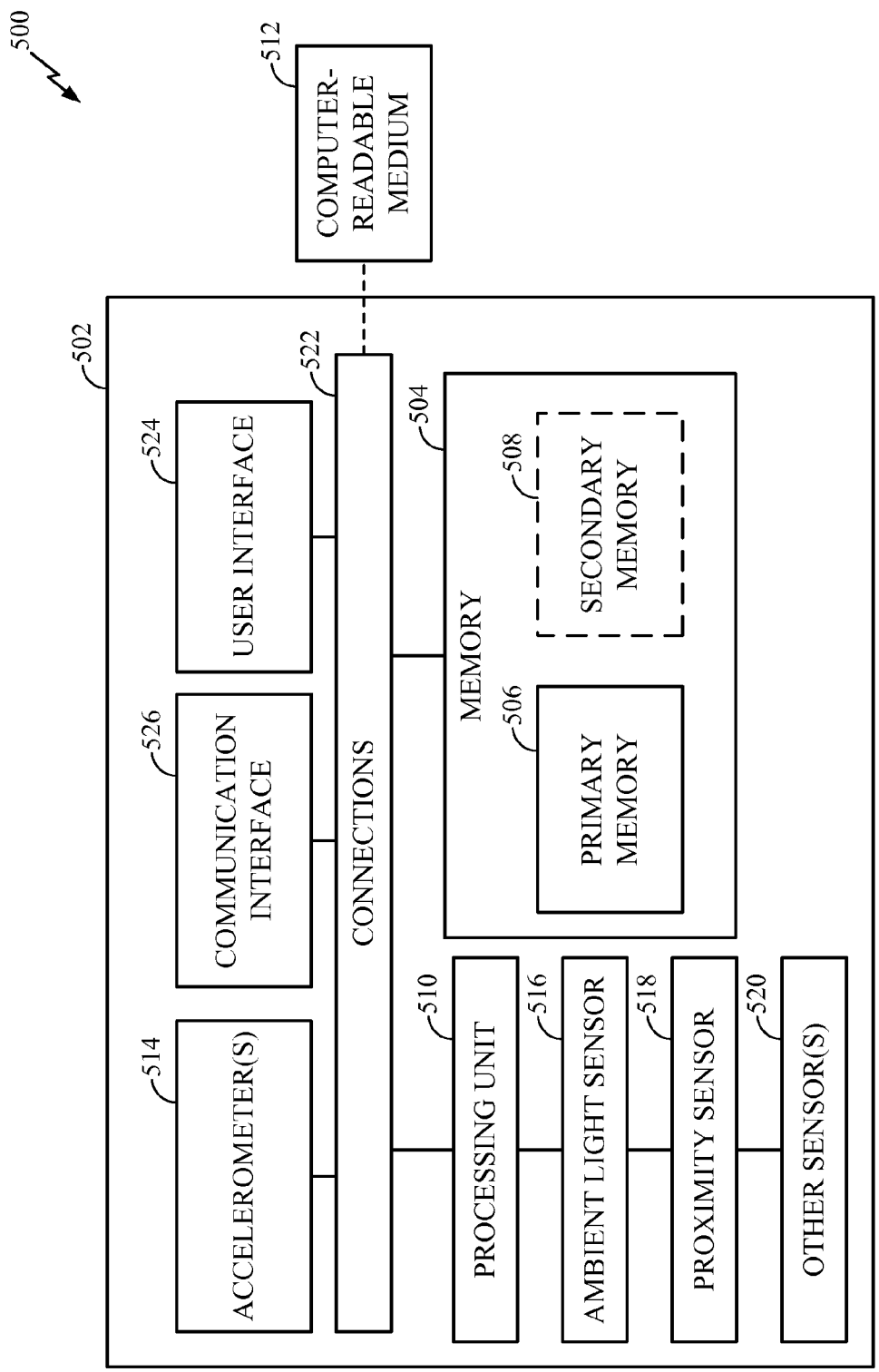
FIG. 5 is a schematic diagram illustrating an example computing environment associated with a mobile device according to an implementation.

FIG. 5 is a schematic diagram illustrating an implementation of an example computing environment 500 that may include one or more networks or devices capable of partially or substantially implementing or supporting one or more processes for machine learning of situations via pattern matching or recognition. It should be appreciated that all or part of various devices or networks shown in computing environment 500, processes, or methods, as described herein, may be implemented using various hardware, firmware, or any combination thereof along with software.

Computing environment 500 may include, for example, a mobile device 502, which may be communicatively coupled to any number of other devices, mobile or otherwise, via a suitable communications network, such as a cellular telephone network, the Internet, mobile ad-hoc network, wireless sensor network, or the like. In an implementation, mobile device 502 may be representative of any electronic device, appliance, or machine that may be capable of exchanging information over any suitable communications network. For example, mobile device 502 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 502 may take the form of one or more integrated circuits, circuit boards, or the like that may be operatively enabled for use in another device. Thus, unless stated otherwise, to simplify discussion, various functionalities, elements, components, etc. are described below with reference to mobile device 502 may also be applicable to other devices not shown so as to support one or more processes associated with example computing environment 500.

Although not shown, optionally or alternatively, there may be additional devices, mobile or otherwise, communicatively coupled to mobile device 502 to facilitate or otherwise support one or more processes associated with computing environment 500. For example, computing environment 500 may include various computing or communication resources capable of providing position or location information with regard to a mobile device 502 based, at least in part, on one or more wireless signals associated with a positioning system, location-based service, or the like. To illustrate, in certain example implementations, mobile device 502 may include, for example, one or more location devices capable of acquiring or providing all or part of orientation, position, or location information. Such information may be provided in support of one or more processes in response to user instructions, motion-controlled or otherwise, which may be stored in memory 504, for example, along with other suitable or desired information, such as one or more signal-related patterns, templates, rules, snapshots, databases, or the like.

Memory 504 may represent any suitable or desired information storage medium. For example, memory 504 may include a primary memory 506 and a secondary memory 508. Primary memory 506 may include, for example, a random access memory, read only memory, etc. While illustrated in this example as being separate from a processing unit 510, it should be appreciated that all or part of primary memory 506 may be provided within or otherwise co-located/coupled with processing unit 510. Secondary memory 508 may include, for example, the same or similar type of memory as primary memory or one or more information storage devices or systems, such as, for example, a disk drive, an optical disc drive, a tape drive, a solid state memory drive, etc. In certain implementations, secondary memory 508 may be operatively receptive of, or otherwise enabled to be coupled to, a computer-readable medium 512.

Computer-readable medium 512 may include, for example, any medium that can store or provide access to information, code or instructions (e.g., an article of manufacture, etc.) for one or more devices associated with operating environment 500. For example, computer-readable medium 512 may be provided or accessed by processing unit 510. As such, in certain example implementations, the methods or apparatuses may take the form, in whole or part, of a computer-readable medium that may include computer-implementable instructions stored thereon, which, if executed by at least one processing unit or other like circuitry, may enable processing unit 510 or the other like circuitry to perform all or portions of a location determination processes, sensor-based or sensor-supported measurements (e.g., acceleration, deceleration, orientation, tilt, rotation, distance, luminous intensity, etc.) or any like processes to facilitate or otherwise support gesture detection of mobile device 502. In certain example implementations, processing unit 510 may be capable of performing or supporting other functions, such as communications, gaming, or the like.

It should be understood that a storage medium, such as memory 504, computer-readable medium 512, etc. may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Processing unit 510 may be implemented in hardware or a combination of hardware and software. Processing unit 510 may be representative of one or more circuits capable of performing at least a portion of information computing technique or process. By way of example but not limitation, processing unit 510 may include one or more processors, controllers, microprocessors, microcontrollers, application specific integrated circuits, digital signal processors, programmable logic devices, field programmable gate arrays, or the like, or any combination thereof.

Mobile device 502 may include various components or circuitry, such as, for example, one or more accelerometers 514, ambient light sensors or detectors 516, proximity sensors 518, or various other sensor(s) 520, such as a gyroscope, magnetometer, microphone, camera, GPS, WiFi, Bluetooth™-enabled devices, etc. to facilitate or otherwise support one or more processes associated with operating environment 500. For example, such sensors may provide analog or digital signals to processing unit 510. Although not shown, it should be noted that mobile device 502 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

Although not shown, mobile device 502 may also include a memory or information buffer to collect suitable or desired information, such as, for example, inertial or ambient environment sensor measurement information, and a power source to provide power to some or all of the components or circuitry. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) mobile device 502.

Mobile device 502 may include one or more connections 522 (e.g., buses, lines, conductors, optic fibers, etc.) to operatively couple various circuits together, and a user interface 524 (e.g., display, touch screen, keypad, buttons, knobs, microphone, speaker, trackball, data port, etc.) to receive user input, facilitate or support sensor measurements, or provide information to a user. Mobile device 502 may further include a communication interface 526 (e.g., wireless transmitter or receiver, modem, antenna, etc.) to allow for communication with one or more other devices or systems over one or more suitable communications networks, as was indicated.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2"(3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In one particular implementation, a mobile device may, for example, be capable of communicating with one or more femtocells facilitating or supporting communications with the mobile device for the purpose of estimating its location, orientation, velocity, situation, or the like. As used herein, "femtocell" may refer to one or more smaller-size cellular base stations that may be enabled to connect to a service provider's network, for example, via broadband, such as, for example, a Digital Subscriber Line (DSL) or cable. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:
1. A method comprising:
monitoring, at a mobile device, input signals from a plurality of information sources associated with said mobile device;
detecting at least one condition based, at least in part, on at least one of said monitored input signals;

identifying a first pattern based, at least in part, on said at least one detected condition; and fixing a subset of varying parameters associated with said first pattern by associating at least one parameter of said subset of varying parameters with said first pattern to represent said at least one detected condition, said varying parameters derived, at least in part, from said monitored input signals.

2. The method of claim 1, wherein said fixing said subset of varying parameters comprises associating said varying parameters to represent a condition derived from said monitored input signals from at least one of the following disposed in said mobile device: an accelerometer, a Global Positioning System (GPS)-enabled device, a Wireless Fidelity (WiFi)-enabled device, or any combination thereof.

3. The method of claim 1, and further comprising initiating a process to attempt a recognition of a second pattern in connection with said monitoring said input signals based, at least in part, on said first identified pattern.

4. The method of claim 3, wherein said second pattern is recognized in a reduced set of varying parameters derived from said monitored input signals in response, at least in part, to said fixing of said subset of varying parameters.

5. The method of claim 3, wherein said process further comprises:

capturing a snapshot of said monitored input signals in response to said detection of said at least one condition, said monitored input signals defining at least one context-related information stream; and correlating said snapshot with said second pattern in a database.

6. The method of claim 5, wherein said second pattern is attempted to be recognized in connection with correlating said snapshot with at least one of the following: a temporal pattern, an action-correlated pattern, a transition-correlated pattern, a relational pattern, or any combination thereof.

7. The method of claim 5, wherein said snapshot comprises at least one of the following: a snapshot of said first identified pattern, a snapshot of said second pattern, a snapshot of said at least one context-related information stream, or any combination thereof.

8. The method of claim 5, wherein said snapshot is correlated in connection with a captured history of said at least one context-related information stream.

9. The method of claim 8, wherein said history comprises a time period captured prior to said detecting said at least one condition.

10. The method of claim 9, wherein said time period comprises a time period existing for a threshold duration.

11. The method of claim 10, wherein said threshold duration comprises a duration relevant to said at least one detected condition.

12. The method of claim 5, wherein said database comprises at least one of the following: a condition database, a correlation database, or any combination thereof.

13. The method of claim 12, wherein said condition database comprises said at least one context-related information stream.

14. The method of claim 12, wherein said correlation database comprises at least one of the following: a condition correlation database, a transition correlation database, or any combination thereof.

15. The method of claim 1, wherein at least one of said plurality of information sources comprises signals generated in response to at least one of the following: a user executing an instruction on said mobile device, a host application executing an instruction on said mobile device, or any combination thereof.

16. The method of claim 15, wherein said host application executes said instruction in response to at least one signal received from at least one sensor associated with said mobile device.

17. The method of claim 1, wherein said fixed subset of said varying parameters comprises said first pattern.

18. The method of claim 1, and further comprising identifying at least one pattern irrelevant to said at least one condition in connection with said monitoring input signals.

19. The method of claim 18, wherein said irrelevant pattern is identified via an application of at least one of the following: a context labeling-type process, a situation labeling-type process, or any combination thereof.

20. The method of claim 18, wherein said irrelevant pattern is identified in connection with a user identifying at least one of the following: a relevant information source among said plurality of information sources, a relevant information stream among a plurality of context-related information streams, or any combination thereof.

21. An apparatus comprising:

a mobile device comprising at least one processor configured to:

monitor input signals from a plurality of information sources associated with said mobile device;

detect at least one condition based, at least in part, on at least one of said monitored input signals;

identify a first pattern based, at least in part, on said at least one detected condition; and fix a subset of varying parameters associated with said first pattern by associating at least one parameter of said subset of varying parameters with said first pattern to represent said at least one detected condition, said varying parameters derived, at least in part, from said monitored input signals.

22. The apparatus of claim 21, wherein said at least one processor is further configured to initiate a process to attempt a recognition of a second pattern in connection with said processor to monitor said input signals based, at least in part, on said first identified pattern.

23. The apparatus of claim 22, wherein said second pattern is associated with a reduced set of varying parameters derived from said monitored input signals due, at least in part, to fixing said subset of varying parameters.

24. The apparatus of claim 22, wherein said processor is further configured to:

capture a snapshot of said monitored input signals in response to said detection of said at least one condition, said monitored input signals defining at least one context-related information stream; and correlate said snapshot with said second pattern in a database.

25. The apparatus of claim 24, wherein said snapshot comprises at least one of the following: a snapshot of said first identified pattern, a snapshot of said second pattern, a snapshot of said at least one context-related information stream, or any combination thereof.

26. The apparatus of claim 24, wherein said second pattern is attempted to be recognized in connection with said correlation of said snapshot with at least one of the following: a temporal pattern, an action-correlated pattern, a transition-correlated pattern, a relational pattern, or any combination thereof.

27. The apparatus of claim 24, wherein said snapshot is correlated in connection with a captured history of said at least one context-related information stream.

28. The apparatus of claim 21, wherein at least one of said plurality of information sources comprises signals generated in response to at least one of the following: a user executing an instruction on said mobile device, a host application executing an instruction on said mobile device, or any combination thereof.

29. The apparatus of claim 21, wherein said fixed subset of said varying parameters comprises said first pattern.

30. The apparatus of claim 21, wherein said at least one processor is further configured to identify at least one pattern irrelevant to said at least one condition in connection with said processor to monitor said input signals.

31. An apparatus comprising:
  means for monitoring, at a mobile device, input signals from a plurality of information sources associated with said mobile device;
  means for detecting at least one condition based, at least in part, on at least one of said monitored input signals;
  means for identifying a first pattern based, at least in part, on said at least one detected condition; and
  means for fixing a subset of varying parameters associated with said first pattern by associating at least one parameter of said subset of varying parameters with said first pattern to represent said at least one detected condition, said varying parameters derived, at least in part, from said monitored input signals.

32. The apparatus of claim 31, and further comprising means for initiating a process to attempt a recognition of a second pattern in connection with said monitoring said input signals based, at least in part, on said first identified pattern.

33. The apparatus of claim 32, wherein said second pattern is associated with a reduced set of varying parameters derived from said monitored input signals due, at least in part, to said fixing of said subset of varying parameters.

34. The apparatus of claim 32, wherein said means for initiating said process further comprises:
  means for capturing a snapshot of said monitored input signals in response to said detection of said at least one condition, said monitored input signals defining at least one context-related information stream; and
  means for correlating said snapshot with said second pattern in a database.

35. The apparatus of claim 34, wherein said second pattern is attempted to be recognized in connection with correlating said snapshot with at least one of the following: a temporal patter, an action-correlated pattern, a transition-correlated pattern; a relational pattern, or any combination thereof.

36. The apparatus of claim 34, wherein said snapshot comprises at least one of the following: a snapshot of said first identified pattern, a snapshot of said second pattern, a snapshot of said at least one context-related information stream, or any combination thereof.

37. The apparatus of claim 34, wherein said snapshot is correlated in connection with a captured history of said at least one context-related information stream.

38. The apparatus of claim 37, wherein said history comprises a time period captured prior to said detecting said at least one condition.

39. The apparatus of claim 38, wherein said time period comprises a time period existing for a threshold duration.

40. The apparatus of claim 39, wherein said threshold duration comprises a duration relevant to said at least one detected condition.

41. The apparatus of claim 34, wherein said database comprises at least one of the following: a condition database, a correlation database, or any combination thereof.

42. The apparatus of claim 31, wherein at least one of said plurality of information sources comprises signals generated in response to at least one of the following: a user executing an instruction on said mobile device, a host application executing an instruction on said mobile device, or any combination thereof.

43. The apparatus of claim 31, wherein said fixed subset of said varying parameters comprises said first pattern.

44. The apparatus of claim 31, and further comprising means for identifying at least one pattern irrelevant to said at least one condition in connection with said monitoring said input signals.

45. The apparatus of claim 44, wherein said irrelevant pattern is identified via an application of at least one of the following: a context labeling-type process, a situation labeling-type process, or any combination thereof.

46. An article comprising:
  a non-transitory storage medium having instructions stored thereon executable by a special purpose computing platform at a mobile device to:
  monitor input signals from a plurality of information sources associated with said mobile device;
  detect at least one condition based, at least in part, on at least one of said monitored input signals;
  identify a first pattern based, at least in part, on said at least one detected condition; and
  fix a subset of varying parameters associated with said first pattern by associating at least one parameter of said subset of varying parameters with said first pattern to represent said at least one detected condition, said varying parameters derived, at least in part, from said monitored input signals.

47. The article of claim 46, wherein said storage medium further includes instructions to initiate a process to attempt a recognition of a second pattern in connection with said monitoring said input signals based, at least in part, on said first identified pattern.

48. The article of claim 47, wherein said instructions to initiate said process further comprise instructions to:
  capture a snapshot of said monitored input signals in response to said detection of said at least one condition, said monitored input signals defining at least one context-related information stream; and
  correlate said snapshot with said second pattern in a database.

49. The article of claim 47, wherein said second pattern is attempted to be recognized in connection with at least one of the following: a temporal pattern, an action-correlated pattern, a transition-correlated pattern, a relational pattern, or any combination thereof.

50. The article of claim 48, wherein said snapshot comprises at least one of the following: a snapshot of said first identified pattern, a snapshot of said second pattern, a snapshot of said at least one context-related information stream, or any combination thereof.

51. The article of claim 48, wherein said snapshot is correlated in connection with a captured history of said at least one context-related information stream.

52. The article of claim 46, wherein said storage medium further includes instructions to identify at least one pattern irrelevant to said at least one condition in connection with said monitoring said input signals.

53. The article of claim 52, wherein said irrelevant pattern is identified via an application of at least one of the following:

a context labeling-type process, a situation labeling-type process, or any combination thereof.

* * * * *